T. L. FAWICK

May 2, 1933.

Re. 18,810

MOTOR SUPPORT

8 Sheets-Sheet 1

Original Filed Dec. 20, 1923

Witnesses:
W. P. Kilroy
Mary A. L. White

Inventor:
Thomas L. Fawick
Brown Boettcher &
By Dinner
Attys.

T. L. FAWICK

May 2, 1933.

Re. 18,810

MOTOR SUPPORT

8 Sheets-Sheet 2

Original Filed Dec. 20, 1923

Witnesses:
W. P. Kilroy
Henry R. L. White

Inventor:
Thomas I. Fawick
Brown Boettcher
Dunner
By Attys.

T. L. FAWICK

May 2, 1933. Re. 18,810

MOTOR SUPPORT

8 Sheets-Sheet 3

Original Filed Dec. 20, 1923

Witnesses:
W. F. Kilroy
Harry R. Leviste

Inventor:
Thomas L. Fawick
By Brown Berlicker & Dennis
Attys

May 2, 1933.

T. L. FAWICK

MOTOR SUPPORT

Original Filed Dec. 20, 1923

Re. 18,810

8 Sheets-Sheet 4

Witnesses:
W. F. Kilroy
Harry R. LeWhite

Inventor:
Thomas L. Fawick
By Brown, Boettcher & Dienner
Attys.

May 2, 1933.

T. L. FAWICK

MOTOR SUPPORT

Original Filed Dec. 20, 1923

Re. 18,810

8 Sheets-Sheet 5

Witnesses:
W. P. Kilroy
Harry R. Lerbile

Inventor:
Thomas L. Fawick
By Brown Bottemiller Dunner
Attys.

May 2, 1933.

T. L. FAWICK

MOTOR SUPPORT

Original Filed Dec. 20, 1923

Re. 18,810

8 Sheets-Sheet 6

Witnesses:
W. F. Kilroy
Harry E. White

Inventor:
Thomas L. Fawick
By Brown Bortner & Dinner Attys

May 2, 1933.

T. L. FAWICK

MOTOR SUPPORT

Original Filed Dec. 20, 1923

Re. 18,810

8 Sheets-Sheet 7

Witnesses:
W. F. Kilroy
Harry A. L. Mute

Inventor:
Thomas L. Fawick
By Brown, Cornell, Dienner
Attys

T. L. FAWICK

May 2, 1933.

MOTOR SUPPORT

Re. 18,810

8 Sheets-Sheet 8

Original Filed Dec. 20, 1923

Witnesses:
W. P. Kilroy
Harry R. Lubitz

Inventor:
Thomas L. Fawick
By Brown, Boulden & Dennis
Attys.

Reissued May 2, 1933

Re. 18,810

UNITED STATES PATENT OFFICE

THOMAS L. FAWICK, OF AKRON, OHIO

MOTOR SUPPORT

Original No. 1,782,091, dated November 18, 1930, Serial No. 681,766, filed December 20, 1923. Application for reissue filed November 17, 1932. Serial No. 643,047.

My invention relates generally to improvements in vehicle construction, and more particularly to improved means for connecting one part of a vehicle to or suspending it from a related part.

While I shall describe the invention in connection with the details of certain particular embodiments, it is to be understood that the invention is not limited to such uses, but may be employed wherever found adaptable.

To permit proper action of the supporting springs of motor vehicles, it is customary at present, to shackle the springs by means of pivoted swiveling shackles, in the form of metallic links pivoted or swiveled by means of pins, shackle bolts or the like. Relative movement between the spring and the part to which it is connected is placed in the joints of such shackles. Dust and dirt collect in these joints and the shackles being constantly in action, when the vehicle is in use, and employing metal to metal contact, great stresses and wear are produced. Loose joints and noise are inevitable results, and the control of relative movement between the parts is gradually impaired with a resulting loose rocking of one part on the other and a resulting rattling and knocking between the parts. Such shackles become loose and noisy and ordinarily they provide only for permitting relative up and down movement between the parts and the accompanying elongation and shortening of the spring as it deflects. They do not ordinarily act in weaving of the frame or relative lateral movement between the parts. In any yieldable connection in which there is metal to metal contact in the form of bolts, pins, swivel joints, shackles, or the like, wear is great and lubrication is of vital importance. Adequate lubrication of such parts is practically impossible. Shackles of the foregoing type are made more objectionable by the high speed of travel of the present day vehicle, the relatively heavy loads and the severe road shocks and vibration to which the vehicle is subjected.

Cushioned connections have been proposed in which the end of the spring is journaled between a pair of cushioned blocks, but the blocks of such devices act only in the relatively up and down movement between the parts. Upon movement of the parts vertically together one block acts in compression and upon vertical separation of the parts the other block acts in compression. Neither block is attached to either part. Elongation and shortening of the spring is permitted by sliding movement of the end of the spring between the cushion blocks. This causes great wear which necessitates providing the blocks with metal facing plates and after a period of use the matter of retaining the blocks properly seated is difficult. Clamping or bolting of each of the relatively movable parts to a flexible coupling confines the action of the coupling to a flexing at each of the points of clamping attachment of the relatively movable parts therewith, which minimizes the flexibility, impairs the mechanical strength and shortens the life of the coupling.

The primary object of my invention is to eliminate the wear, noise and loose joints in devices of this sort and to increase the life and flexibility and improve the functioning of such devices. To this end I provide an improved flexible shackle or coupling for connecting the related parts or suspending one part from the other, without the contact of metal to metal at any point.

Another object is the provision of a simple and practical device which will act not only in relative up and down movement, but in all other directions of movement between the parts, and which will, at the same time, provide a positive mechanical connection between the parts, without having its flexibility confined to a flexing action at the points of attachment with the parts. Relative movement between the connected parts is placed in the body of the flexible coupling. There are no joints which will wear and collect dust and dirt.

Another object is to provide a device of great mechanical strength and to provide for connecting the related parts to the device without impairing its mechanical strength or its flexibility.

Another object is the provision of a device which will act in relative movement between the parts in all directions and which will tend to absorb the vibration and shocks between the parts.

According to my invention I provide a coupling of flexible material, such as rubber, impregnated belting, fabric or other flexible non-metallic material. The coupling may be made up in one or more layers and is preferably looped upon coupling carrying means on one of the relatively movable vehicle parts. The other part is secured preferably fixedly to the intermediate portion of the coupling. The coupling is preferably in the form of a continuous band looped upon the coupling carrying means. It need not however be continuous and looping at one point only is contemplated. Maximum strength and flexibility is secured and perfect freedom of motion between the parts in all directions is permitted without the inevitable wear, noise, loose joints and uncontrolled rocking and rattling of one part on another, heretofore encountered.

Looping of the coupling upon carrying means on one part loosely attaches the coupling to that part, so that although the coupling positively connects the parts and acts in all directions of relative movement, it is free to slip or creep in action over the carrying means on one part. The flexibility of the coupling permits flexing at the point of looped or loose attachment, but the coupling is not confined to flexing at that point and its life and strength are increased. The coupling acts in tension in all directions of relative movement and it connects the relatively movable members so that there is no relative movement free of the coupling in any direction. Buckling of the coupling in action is minimized. These items and the manner of securing them are important aspects of the invention and other manners of carrying them out are contemplated. For example, loose attachment to either or both of the relatively movable members other than by looping is contemplated. Looping may be to either or both of the relatively movable members and the order of looping may be varied. The looped attachment to one member may be on opposite sides or it may be between points of attachments to the other member.

Crossing of the coupling in looping it is also contemplated. In crossing the coupling I find that advantageous results are secured and couplings embodying this feature with or without looping are contemplated.

I propose to use the coupling of my present invention for anchoring either or all ends of any of the various front and rear vehicle springs, also for anchoring various torque or torsion arms and for anchoring the apex of the V-shaped brace of the vehicle construction shown and described in my copending application, Case 5, Serial No. 619,840, filed February 19, 1923.

I also propose an improved engine mounting with the flexible loops of my present invention. While I am not limited to a particular engine or motor mounting I provide an improved three point suspension which will be flexible and yield or accommodate itself to the twisting, weaving and straining of the chassis frame and in which at the same time the flexible points of support will produce a balancing action with respect to each other so that while the desired flexibility is secured excessive free movement or play between the parts is prevented.

Other uses are also contemplated.

In order to acquaint those skilled in the art with the manner of constructing and using devices embodying my present invention, I shall now describe in connection with the accompanying drawings certain specific embodiments of the same.

In the drawings:—

Figure 1:
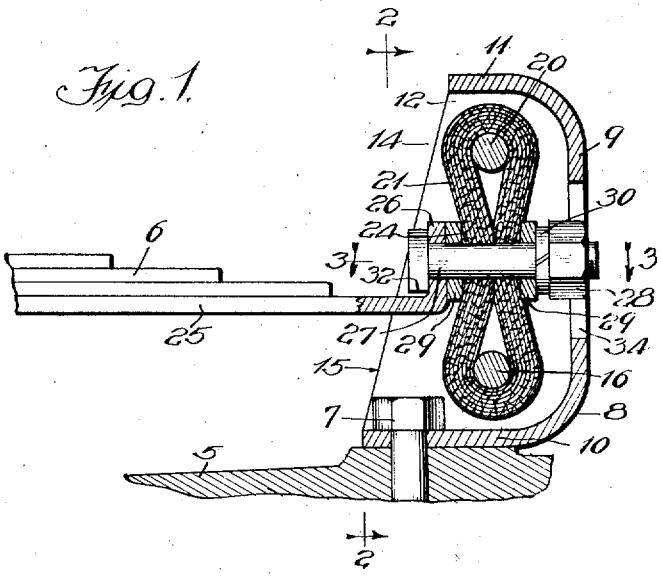
Figure 1 is a vertical section of one embodiment of the invention taken on line 1—1 of Figure 2.

In the embodiment shown in Figures 1, 2 and 3, 5 designates the axle, and spring 6 is shown of semi-elliptic form lying parallel to and above axle 5, as is common in vehicles of the "Ford" type. Mounted by means of a stud or bolt 7 on axle 5 at the point where the shackle hanger is ordinarily mounted in constructions of the type shown, is a hood or housing 8, one adjacent each end of spring 6. Each hood 8 has an outer wall 9 from which horizontal bottom and top walls 10 and 11 and vertical side walls 12 and 13 are turned in, the inner side of the hood being open at 14. Bottom wall 10 preferably projects beyond top wall 11 to properly receive bolt or stud 7, and the inner side edges of side walls 12 and 13 extend obliquely from bottom wall 10 to top wall 11, as shown at 15.

Side walls 12—13 are provided with horizontal aligned openings through which the shank of a bolt 16 extends, the head of bolt 16 engaging one side wall and the opposite end of the shank of the bolt having threaded engagement with a nut 18 which is drawn up to the other side wall to properly secure the bolt in place. A spring washer 19 may be interposed between wall 12 and nut 18, if desired. Side walls 12 and 13 are provided with a second pair of horizontally aligned openings in which a second bolt 20 parallel to and spaced from bolt 16, is similarly secured. The shanks of bolts 16 and 20 extend transversely through the interior of hood and carry the flexible coupling link 21.

Coupling 21 is formed of rubber, fabric or other suitable flexible non-metallic material. Coupling 21 may be made up of one or more layers. It is preferably in the form of a continuous band arranged within hood 8 and looped about the shanks of bolts 20—16. It is of a width to fit snugly between side walls 12—13. The continuous looped formation of band 21 makes the intermediate portion 24 of the band of double thickness and the adjacent end of lower leaf 25 of spring 6 is turned up at 26 and fixedly secured to intermediate portion 24 by a bolt 27 which extends through turned up end 26 and through the intermediate portion 24 and has threaded engagement with a nut 28. Washers 29, preferably of fiber or other suitable material, are interposed between the flexible coupling and turned up end 26 on one side and between the coupling and nut 28 on the other side, and a spring washer 30 is preferably interposed between nut 28 and adjacent washer 29 to hold the parts properly clamped together. The head of bolt 27 has a flat edge 32 cooperable with spring 6 to prevent the bolt from turning loose and an opening 34 in wall 9 permits access to nut 28. Nut 28 while normally held securely in place, may be conveniently removed and by withdrawing bolt 27 the spring can be disconnected from the flexible coupling. Band 21 may be removed by removing bolts 16 and 20.

Looping of the coupling upon bolts 16 and 20 binds the coupling securely to one part without requiring bolt holes in the coupling and without clamping engagement with the coupling at that point so that the coupling is not limited to flexing about a rigid connection at that point. Looping of the coupling upon the shanks of bolts 16 and 20 loosely attaches the coupling to axle 5, so that in addition to its flexibility it is free to slip or creep over bolts 16 and 20 in action. In the elongation and shortening which accompanies deflection of spring 6 in use, the looped ends of coupling 21, instead of being rigidly held, may slip on bolts 16—20. Relative movement between parts 5 and 6 is placed in the flexible coupling and the coupling acts not only in relative up and down movement between the parts and in the elongation and shortening of the spring, but in all other directions of relative movement between the parts. Relative weaving and twisting and relative transverse movement between the parts is permitted. All relative movement is placed in the flexible coupling which properly controls the relative movement and absorbs the shocks and vibration between the parts. There is no metal to metal contact and there is no free sliding movement of the spring, nor is the flexibility of the coupling confined between two points of bolted or other clamped engagement therewith.

While coupling 21 is preferably in the form of a continuous flexible band, it is understood that it need not necessarily be continuous. It may be a strip looped at its opposite ends only, and instead of the two coupling carrying members, looping of the coupling about one member only, or at one instead of both ends, is contemplated. The coupling may, of course, have fixed connection with the axle and looped or other loose connection with the spring instead of looped or loose connection with the axle and fixed connection with the spring as shown, or it may be connected between other related parts. I do not intend by the term "looped" as used in the claims to include only a continuous flexible band looped at its opposite ends and of double thickness along its intermediate portion, but intend to include other looped arrangements and other loose connections.

Figure 3:
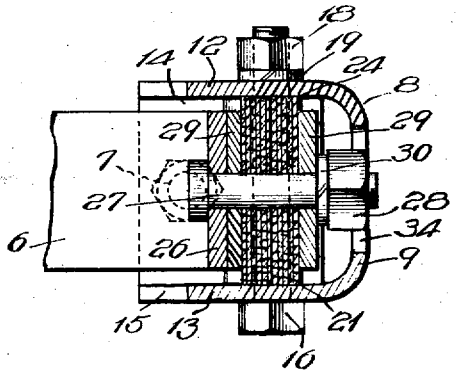
Figure 3 is a horizontal section taken on line 3—3 of Figure 1.
Figure 4:
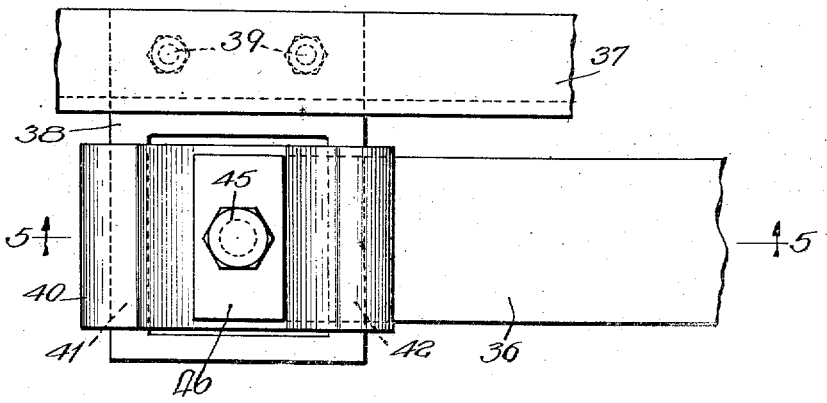
Figure 4 is a plan view of another embodiment of the invention.
Figure 5:
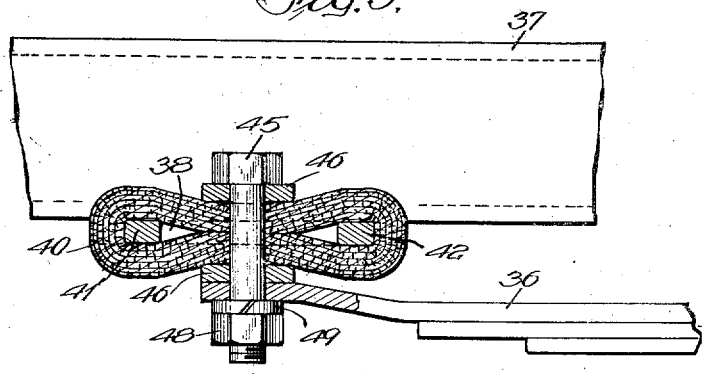
Figure 5 is a vertical section on line 5—5 of Figure 4.

In Figures 4 and 5, the invention is shown embodied in a connection between the channel side member 37 of a vehicle frame and one end of a supporting spring 36 lying parallel to the side member. In this case, the coupling link lies in a horizontal plane instead of in a vertical plane, as in Figures 1, 2 and 3. The coupling carrying member comprises an open rectangular frame 38, fixedly secured to frame member 37 by bolts 39. Coupling 40 is again in the form of a continuous flexible band looped about legs 41—42 of open frame 38. The end of one or more leaves of spring 36 extends beneath and is fixedly secured to the intermediate portion of coupling 40 by means of a bolt 45, washers 46 of fiber or other suitable material being interposed between the coupling and the head of bolt 45 and between the coupling and spring 36. The threaded end of bolt 45 engages in a nut 48 and a spring washer 49 is interposed between spring 36 and nut 48.

Figure 2:
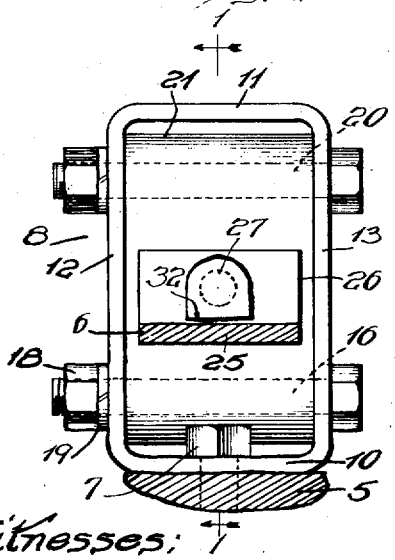
Figure 2 is a vertical transverse section taken on line 2—2 of Figure 1.

The embodiment shown in Figures 4 and 5 is subject to the variations referred to in connection with Figures 1, 2 and 3 and it may be connected between other parts than the spring and the side frame member of the vehicle. The flexible band of the embodiment shown in Figures 4 and 5 acts in a direction parallel to the transverse dimension or thickness of the coupling in the relative up and down movement between the parts and in a direction parallel to its longitudinal dimension in the elongation and the shortening of the spring. It positively connects the parts and acts in all directions of relative movement between them without metal to metal contact and without having its flexibility confined between two points having clamped engagement with it. As before, the band may be of more than one thickness and the looping of the band doubles the layers, whether one or more, at the intermediate portion where the spring is bolted to the coupling.

Figure 6:
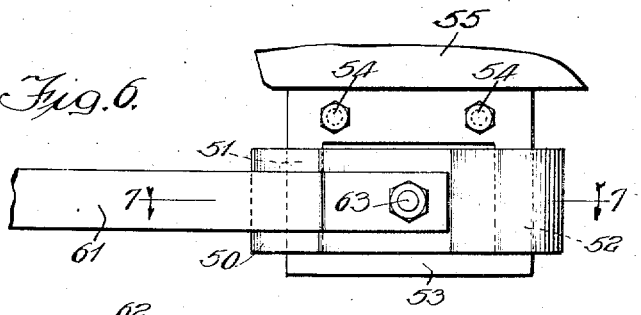
Figure 6 is a side elevation of another embodiment.
Figure 7:
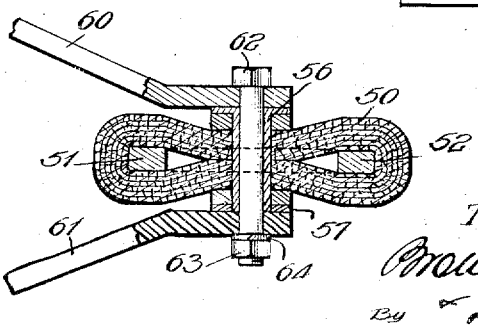
Figure 7 is a horizontal section on line 7—7 of Figure 6.

In Figures 6 and 7 I have shown the coupling of my present invention embodied in an anchor for the apex of the V-shaped brace of the vehicle construction shown and described in my copending application, Case, 5, Serial No. 619,840, filed February 19, 1923. The coupling comprises a continuous flexible band 50 looped about legs 51 and 52 of an open rectangular frame 53 secured by bolts 54 to the bottom of the transmission or flywheel casing or other part 55. Frame 53 is either bolted to the flange of an angle iron secured to and depending from member 55, or the upper edge of the frame may have a mounting flange projecting at right angles to the depending portion of the frame and secured to member 55. A headed sleeve member 56 extends through the opening in the intermediate portion of coupling 50 and has threaded engagement with a nut 57 by means of which the intermediate portions of the flexible loop are clamped together, washers 58 of fiber or other suitable material being clamped between coupling 50 and the head of sleeve 56 on one side and between the coupling and nut 57 on the other side. The converging ends of member 60 and 61 constituting the V-shaped brace are clamped to the intermediate portion of the coupling by a bolt 62 which extends through sleeve 56 and engages in a nut 63. A spring washer 64 is interposed between members 61 and nut 63.

Figure 8:
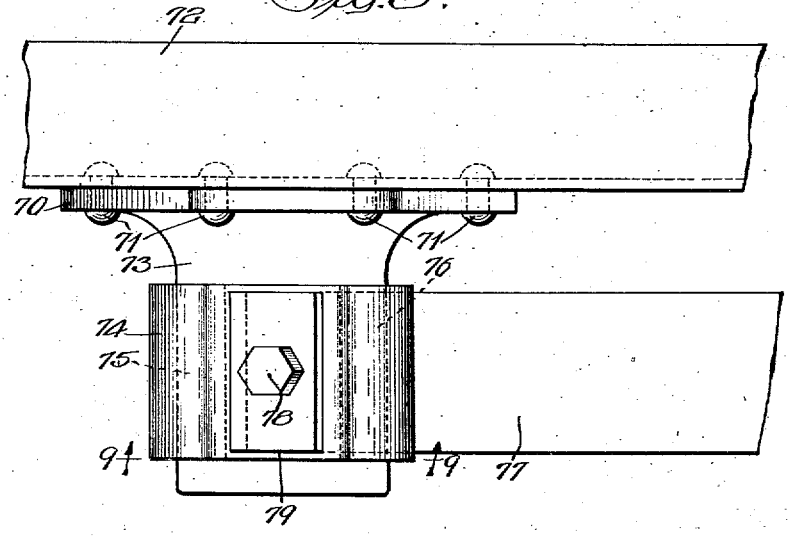
Figure 8 is a plan view of another embodiment.
Figure 9:
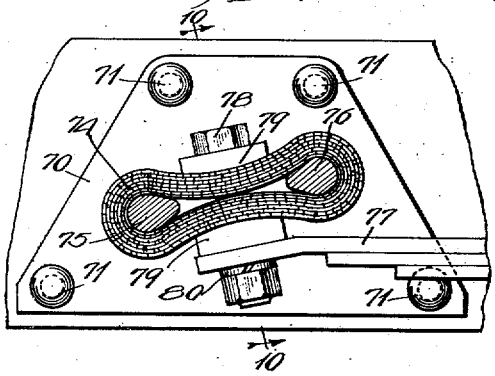
Figure 9 is a vertical section on line 9—9 of Figure 8.
Figure 10:
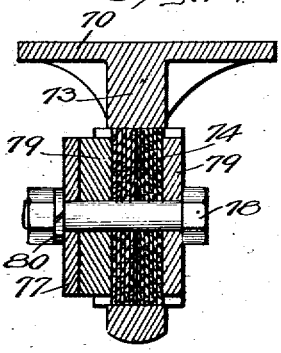
Figure 10 is a horizontal section on line 10—10 of Figure 9.

In the embodiment shown in Figures 8, 9 and 10, the coupling carrying member has a mounting flange 70 secured by rivets 71 to side member 72 of the vehicle frame, and an integral oblique open frame 73. Coupling 74 is looped about legs 75 and 76 of frame 73 and the end of one or more leaves of spring 77, shown lying parallel to frame member 72 is turned obliquely beneath the intermediate portion of coupling 74 and fixedly secured thereto by a bolt 78. Washers 79 of fiber or other suitable material are interposed between the head of bolt 78 and the adjacent sides of the intermediate portion of coupling 74 and between the opposite side of coupling 74 and the adjacent end of spring 77, and a spring washer 80 between the end of spring 77 and the nut on the outer end of bolt 78 holds the bolt and nut securely against accidental displacement.

Figure 11:
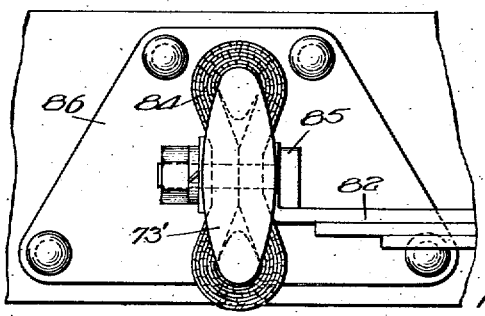
Figure 11 is a side elevation of another embodiment.

The embodiment shown in Figure 11 is adapted for mounting the front end of the rear spring 82 upon the side member 83 of the vehicle frame along which it extends, although it is not limited to such use. It is substantially like the embodiment shown in Figures 8, 9 and 10, except the coupling carrying frame 73′ is disposed vertically instead of obliquely, and upturned end of spring 82 is secured to the intermediate portion of coupling 84 by a bolt 85, the head of which cooperates with spring 82 to prevent unloosening of the bolt and the fiber washers are omitted. This may, of course, be employed, if desired.

Figure 13:
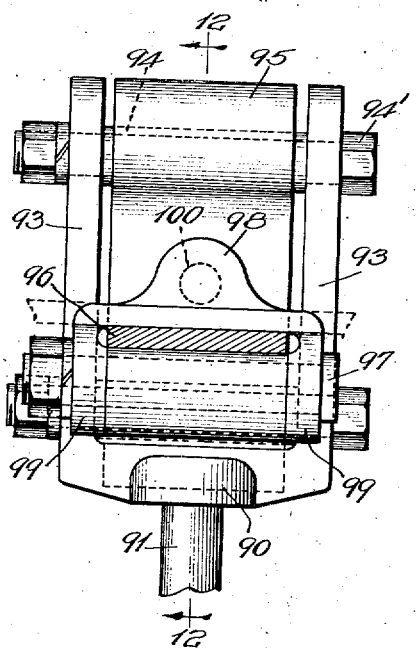
Figure 13 is a side elevation partially in section of the embodiment shown in Figure 12.
Figure 12:
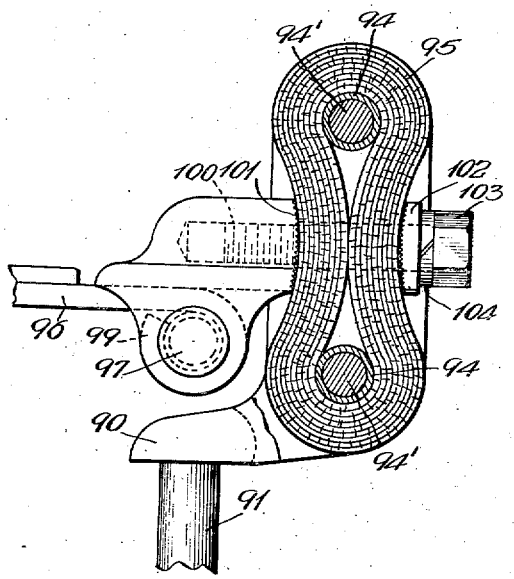
Figure 12 is a section of another embodiment on line 12—12 of Figure 13.

The embodiment of Figures 12 and 13 is particularly adapted for anchoring the front end of the "Overland" front spring, although, of course, it is adapted for use in other connections. It comprises a yoke 90 having a stud 91 adapted to be secured in the lateral shackle stud opening in the "Overland" front axle, for example. Between the projecting arms 93 of yoke 90 and looped upon sleeves 94 mounted upon the shanks of bolts 94′ which are in turn mounted in arms 93, is the flexible coupling 95. Sleeves 94 maintain proper spacing of arms 93 and form excellent mountings for the looped coupling 95. Fastened to the end of one or more leaves of the present supporting spring 96 by the present type of spring bolt 97 is an attachment eye 98. The depending lugs 99 of eye 98, between which the end of spring 96 is secured, are preferably forged flat, as shown in dotted lines in Figure 13, and are then turned down, as shown in full lines in Figures 12 and 13. Eye 98 has an internally threaded socket 100 and a serrated face 101 between which and a correspondingly carried faced washer 102 the intermediate portion of coupling 95 is clamped by a bolt 103, the threaded shank of which screws into the internally threaded socket 100 in eye 98. A spring washer 104 interposed between washer 102 and the head of bolt 103 secures the bolt against accidental displacement. The width of coupling 95 is preferably less than the distance between the arms 93, so that there will be a clearance between the arms and the opposite sides of the coupling, as shown.

Figure 15:
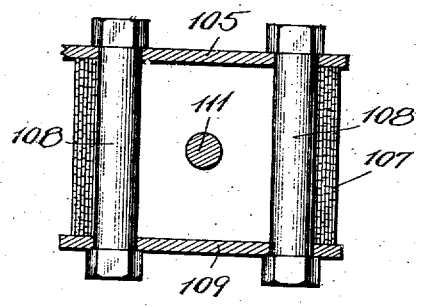
Figure 15 is a section on line 15—15 of Figure 14.
Figure 14:
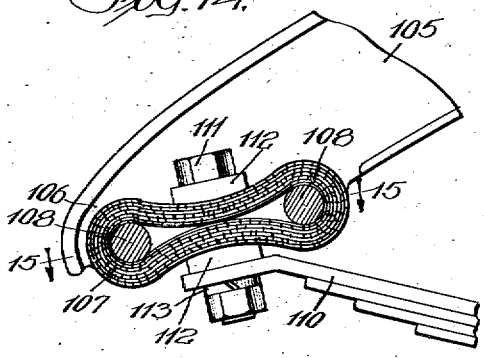
Figure 14 is a vertical section of another embodiment.

In Figures 14 and 15 I have shown a typical front end mounting for front springs of the type which extend parallel with the side members of the frame, although it is not limited to such use. The end of side member 105 is turned down at 106. Flexible coupling 107 is looped upon the shanks of bolts 108 between the web of side frame member 105 and a plate 109, and one or more leaves of spring 110 is turned down and secured to the intermediate portion of coupling 107 by a bolt 111, washers 112 of fiber or other suitable material being provided on opposite sides of the coupling, and a spring washer 113 being provided to hold the bolt and nut against displacement. While two bolts 108 are shown, it is to be understood that a U-bolt may be employed, in which case plate 109 could be omitted.

Figure 16:
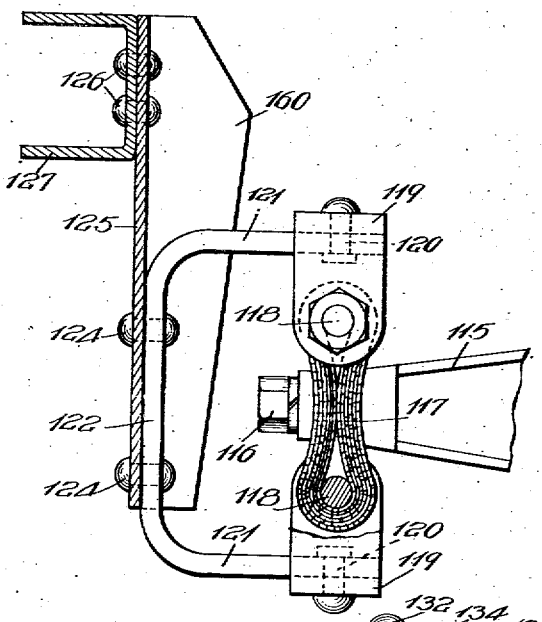
Figure 16 is a side elevation partially in section of another embodiment.

In Figure 16, 115 designates the usual torque or torsion arm which is ordinarily connected at its rear end to the housing on the rear axle, for example. The forward end of said arm 115 is shown secured by a bolt 116 to the intermediate portion of the looped flexible coupling 117, which coupling is looped and thereby freely bound upon the shanks of bolts 118 secured in the upstanding and depending arms or lugs of fittings 119 secured by rivets 120 to the free ends of legs 121 of a U-shaped spring steel bracket 122, the base of which bracket is secured by rivets 124 to the lower end of a bracket 125. Bracket 125 is secured at its upper end by rivets 126 to the base of a channel or U-shaped cross member 127 which may extend between and be secured, for example, at opposite ends to the side members of the vehicle frame, or may be part of or constitute an auxiliary or subframe.

Figure 17:
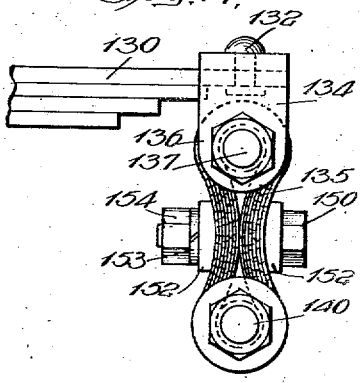
Figure 17 is a side elevational view of another embodiment.
Figure 18:
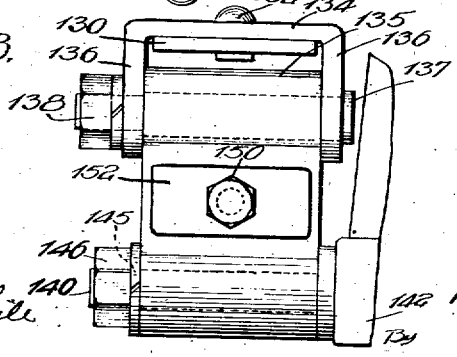
Figure 18 is an end view of the embodiment shown in Figure 17.

In Figures 17 and 18 I show a typical shackle mounting embodying the present invention, particularly adapted for the rear ends of front and rear springs, although it is not limited to such use. One or more leaves of spring 130 is secured by a rivet 132 to the base of a U-shaped fitting 134. One end of flexible coupling 135 is extended between the depending lugs 136 of fitting 134, and is looped upon the shank of a bolt 137 secured in lugs 136 and a spring washer is provided for holding nut 138 and bolt 137 against accidental displacement. The opposite end of coupling 135 is looped upon a bolt 140 carried at one end by an arm 142 depending from the side frame (not shown) of the vehicle, for example. The outer end of the shackle bolt 140 has a circumferential groove 145 in which the internal edge of spring washer 146 engages, nut 148 being drawn up against the washer and clamping the parts together. The intermediate portions of flexible coupling member 135 are clamped together to limit the slip of the coupling in action and to prevent movement of bolts 137 and 140 carried by the spring and frame, respectively, from movement toward each other free of the coupling, by a bolt 150, relatively wide washers 152 of fiber or other suitable material being arranged against the opposite sides of the intermediate portion of the coupling and a spring washer 153 being interposed between nut 154 and adjacent washer 152.

In the embodiment shown in Figures 1, 2 and 3, the hood and bolts constitute an open coupling carrying frame, such as the open frames of Figures 4, 5, 6, 7, 8, 9, 10 and 11. In Figures 12 and 13 the bolts and yoke constitute the same sort of a frame, whereas, in Figures 14 and 15 the frame is constituted by members 105, 109 and bolts 108, and in Figures 16, 17 and 18, by members 119 and bolts 118 and by bolts 137 and 140 and member 134. Bracket member 125 of Figure 16 may have wings 160 for preventing rotation, twisting or relative lateral movement of frame 121.

Figure 19:
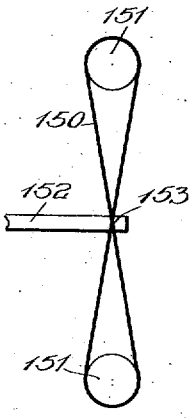
Figures 19, 20, 21, 22, 23, 24 and 25 are diagrammatic views of further embodiments of the invention.

In Figure 19 I have shown band 150 looped upon supporting members 151 carried by one of the relatively movable parts, such as the vehicle frame, and the other relatively movable part 152, such as, for example, the spring of the vehicle, is connected to the intermediate portion of the band or looped coupling. In this case I have shown supporting members 151 of relatively small diameter and spaced a relatively great distance apart. Relative movement between members 151 and 152 is substantially entirely in the direction of the transverse dimension or thickness of coupling 150 and this together with the relatively great distance between intermediate point of attachment 153 and supporting members 151 permits great freedom of motion between the parts.

Figure 20:
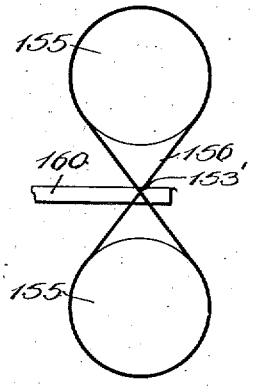

In Figure 20 the supporting members 155 are shown of increased diameter. This causes relative movement between the parts to act instead of substantially entirely in the direction of the transverse dimension or thickness of the coupling 156 partially through the length of the coupling. The result is that less freedom of motion between the parts is permitted than in Figure 19, and there is a tendency for one side of the coupling to balance the movement or action in the other side. Enlargement of supporting members 155 increases the angle from vertical of the sides of the coupling, and, in addition, the surface contact and thereby the frictional resistance to movement of the looped ends of the coupling on supporting members 155 is increased. Enlargement of members 155 also decreases the free lengths of the coupling between said members and the intermediate point of attachment. In Figures 19 and 20 I have shown the attachment of parts 152 and 160 confined to as nearly a point attachment as possible.

Figure 21:
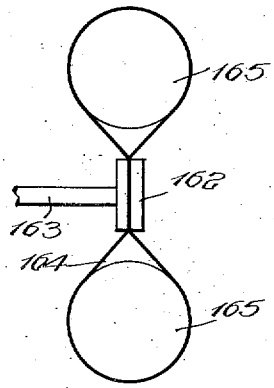

In Figure 21 I provide for still further decreasing freedom of motion between the parts by increasing the length of attachment 162 of part 163 with coupling 164 so as to dispose the points from which the opposite looped ends of the couplings are actuated apart, and each nearer or closer supporting members 165 instead of coincident and at substantially the center of the coupling. This changes the angle of action on the opposite looped ends of the coupling and still further increases the surface contact on members 165.

Figure 22:
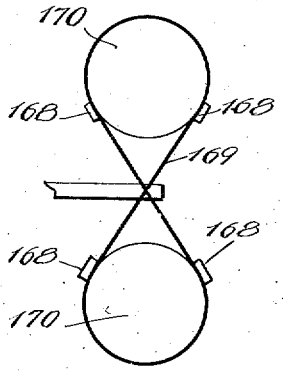

In Figure 22 I provide clamping members 168 for clamping the coupling 169 to supporting member 170. These prevent riding or creeping of the opposite ends of coupling 169 about the surface of member 170, the looping of the ends of the coupling about members 170 serving in this case simply as a convenient form of attachment to the supporting members.

Figure 23:
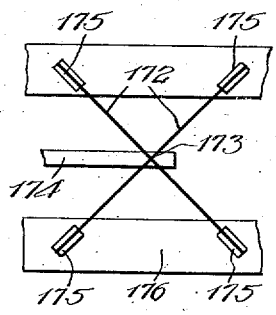

In Figure 23 the coupling comprises two flexible lengths 172 crossed at 173 and attached where they cross to part 174. Looping is omitted entirely in this case, the opposite ends of the crossed coupling links being clamped at their opposite ends, as shown at 175, to the other relatively movable part 176.

Figure 24:
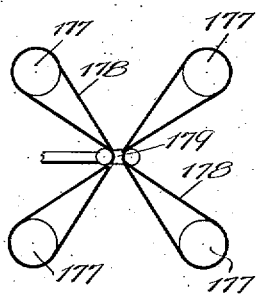

In Figure 24 I provide two pairs of supporting members 177 and two flexible loops 178 attached at 179 to one relatively movable part, the supporting members 177 being carried by the other relatively movable part (not shown). This form permits freedom of rocking motion between the parts and still further decreases or reduces the play between the parts.

Figure 25:
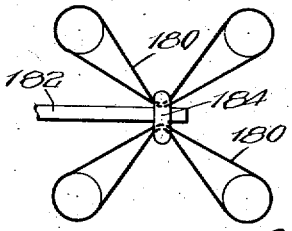
Figure 26:
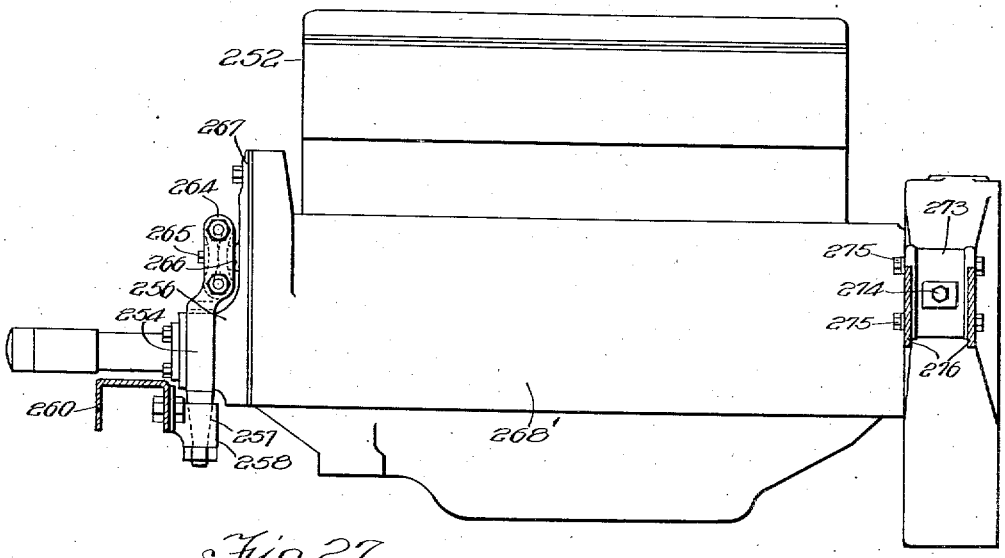
Figure 26 is a side elevational view of an engine mounted with the flexible loops of the present invention.
Figure 27:
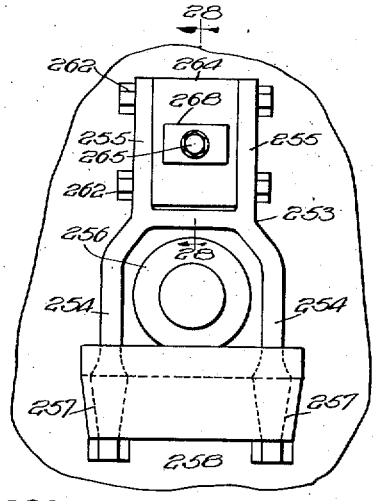
Figure 27 is an enlarged front elevational view of the front end mounting.
Figure 28:
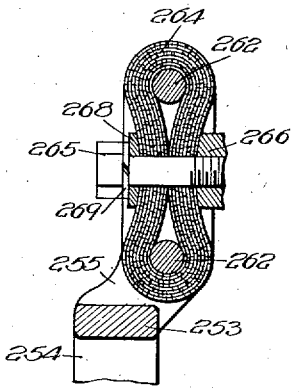
Figure 28 is an enlarged fragmentary section taken on line 28 of Figure 27.
Figure 29:
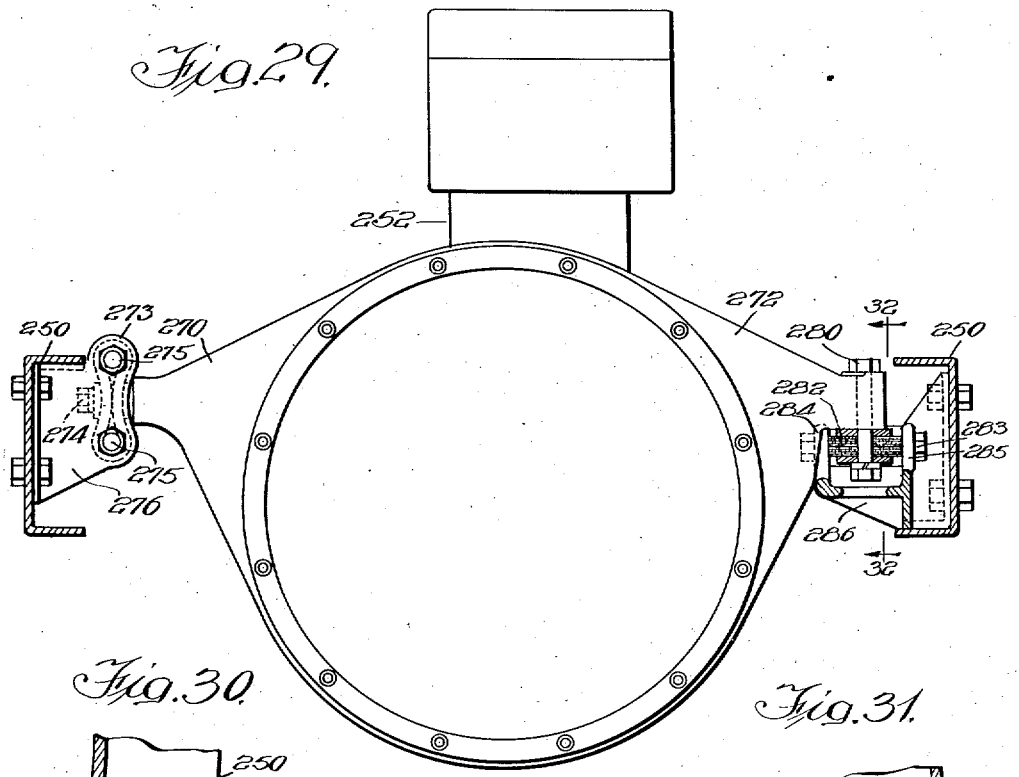
Figure 29 is a rear elevational view showing the longitudinal or side frame members of the vehicle chassis in section.
Figure 30:
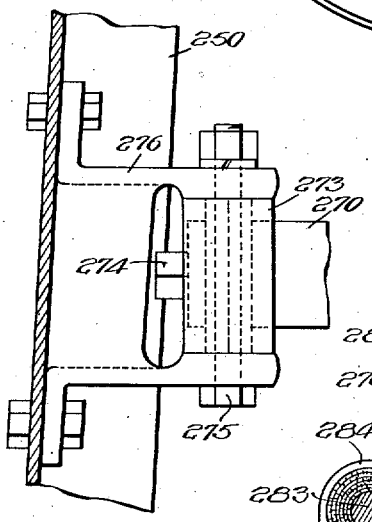
Figure 30 is a plan view of the rear left-hand mounting as viewed in Figure 29.
Figure 31:
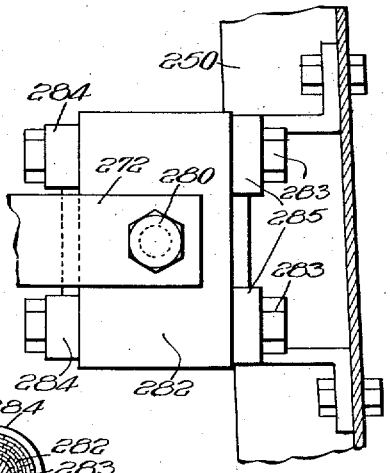
Figure 31 is a similar view of the rear right-hand mounting as viewed in Figure 29.
Figure 32:
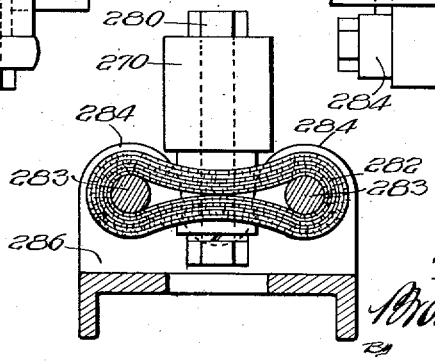
Figure 32 is a detail vertical section on line 32—32 of Figure 29.

In Figure 25 the loops 180 are shown disposed horizontally instead of vertically, as in Figure 24. By attaching part 182 to loops 180, as shown diagrammaticaly at 184, rocking motion is permitted between the parts and play or relative up and down or horizontal movement between the parts is practically eliminated by the balancing action by one side of the coupling to play on the other side, and on the other side to any play on the first side.

In Figures 26 to 32 the invention is shown embodied in a motor or engine mounting, 250—250 designating the longitudinal or side frame members of the vehicle chassis, shown of the usual channel formation and 252 designating the motor or engine mounted therebetween. While I refer to members 250 as the side frame members of the vehicle chassis it is to be understood that similar mounting of the engine upon a sub-frame or mounting of a sub-frame upon the main frame are contemplated, as is the mounting of the liquid carrying and transporting tanks of "tank trucks" and the like.

At the forward end of engine 252 is a frame 253 having depending yoke arms 254 and upstanding yoke arms 255. Arms 254 straddle the forwardly extending boss 256 of the crank case through which boss cranking or starting connection is had with the crank shaft of the engine. The lower ends of arms 254 are tapered at 257 and are seated in correspondingly tapered sockets in a bracket 258 bolted or otherwise attached to a cross member 260 extending transversely between and suitably secured at its opposite ends to side frame members 250.

Looped about the shanks of bolt 262 and arranged between the upright arms 255 of frame 253 in which arm bolts 262 are secured, is a continuous flexible band 264. The intermediate portion of band 264 is fixedly secured to the forward end of motor 252 centrally between side frame members 250, as by means of a bolt 265 threaded into a boss 266 projecting forwardly from the closure plate 267 closing the front end of crank case 268′. A washer 268 is arranged on the shank of bolt 265 against band 264 and a spring washer 269 is interposed between washer 268′ and the head of bolt 265.

The rear end of crank case 268′ has a projection 270 projecting transversely toward one side frame member 250 and a projection 272 projecting transversely in the opposite direction toward the other side frame member 250. While both of the rear mountings may be alike and of either of the two types shown they are preferably different as illustrated for a purpose which will be pointed out. The outer end of projection 270 is fixedly secured to the intermediate portion of a continuous flexible band 273 by a bolt 274. Band 273 is looped about the shanks of bolts 275 and arranged between the projecting arms of a bracket 276 riveted, bolted or otherwise secured to adjacent side frame member 250.

Opposite side or transverse projection 272 overlies and is fixedly secured by a bolt 280 to the central or intermediate portion of a continuous flexible band 282 looped in a horizontal plane about the shanks of a pair of parallel bolts 283. Bolts 283 are secured in lugs 284 and 285 formed integral with a bracket 286 bolted or otherwise secured to adjacent side frame member, and band 282 is arranged between upstanding lugs 284 and 285 as shown. Suitable fibre or other washers are interposed between the underside of the overlying portion of projection 272 and band 282 and between band 282 and the nut threaded on the lower end of bolt 280.

From the foregoing it will now be apparent that a three point mounting for the motor is provided through one support centrally between opposite sides of the forward end of the motor and another at each side of the rear end. Frame 253 permits positioning of the forward support centrally of the motor. Loop 264 is in a vertical plane so that relative longitudinal movement between the frame and chassis is substantially entirely in the direction of the thickness of band 264 while relative vertical movement is through the length of the band. The mounting at the forward end thus permits greater freedom of longitudinal than vertical movement.

At the rear end loop 273 is arranged so that relative longitudinal movement is in the direction of its width and relative vertical movement is in the direction of its length. Relative lateral movement is in the direction of the thickness of the loop 273, thus permitting greater freedom of lateral movement than either longitudinal or vertical movement. Coupling 282 at the opposite side is arranged so that relative longitudinal movement is in the direction of its length and relative vertical movement is in the direction of its thickness. Coupling 282 therefore permits greater freedom of vertical movement than either longitudinal or lateral movement. Relative transverse movement of the engine 252 is in the direction of the width of loop 264, in the direction of the width of loop 282 and in the direction of the thickness of loop 273. The result is a balancing action in the three points of flexible support and the provision of just the desired freedom of motion in the different directions of relative movement between the parts, the flexible supports restraining relative movement more in the direction of greatest movement and less in the direction of least movement.

It is to be noted that, as regards any given bodily movement or vibration of the engine relative to the frame, each of the loops responds thereto with different characteristics, especially different frequency and amplitude characteristics. As regards torsional movement or vibration of the engine, the loops 264 and 273, offering the greater resistance to vertical displacement of the engine, serve to establish a pivotal axis about which the engine rocks, this movement being limited by the loop 282 acting in the direction of its greatest flexibility.

As already pointed out, both rear supports may be alike and they and the front supports may be arranged in any other desired order to secure the desired degree of flexibility in the different directions.

It is well known to those skilled in the art that internal combustion engines, particularly in motor vehicles, tend to move, when operated, relative to the frames in which they are mounted. A flexible mounting of rubber, such as I have proposed, tends to permit this movement, with yieldable restraint or control. Thus, when the tendency of movement is alternately in various directions, the component may result in the engine moving, relative to its support, in a path formulating various geometric figures, regular or irregular. By dividing the rear mounting into two component parts, as I have shown them, the restraint to movement at the rear is greater than at the front and a generally funnel-shaped movement may result. In any event, the yieldably restrained or controlled movement tends to hold the engine reasonably in place and at the same time to dissipate the forces causing the movement.

I claim:

1. The combination with a supporting frame and a motor of a support for supporting the forward end of the motor on said frame, said support comprising a flexible band looped in a vertical direction, supports between opposite sides of the rear of the motor and said frame, one of said last supports comprising a flexible band looped in a vertical direction and the other comprising a flexible band looped in a horizontal direction.

2. In combination, a pair of relatively movable members, a pair of spaced elements mounted on one of said members, and a coupling comprising a band of flexible material encircling the said elements, the two legs of the band being drawn together intermediate the spaced elements and secured to the other movable member.

3. In combination, a pair of relatively movable members, a pair of spaced elements secured to one of said members, a coupling comprising a band of flexible material passed around the said spaced elements a plurality of times forming a belt thereon having a plurality of layers of material in each leg, and means for drawing the legs of the said belt together intermediate the spaced elements and for securing the said belt to the other movable member.

4. In combination, a pair of relatively movable members, a pair of spaced elements secured to one of said members, a coupling comprising a laminated belt of flexible material encircling and looped about the said spaced elements, and a connection for drawing the legs of the said belt together intermediate the spaced elements and for securing the said belt to the other movable member.

5. In combination, a pair of relatively movable members, a pair of spaced elements associated with one of said members, a coupling including a continuous belt of flexible material looped about the said spaced elements and means for drawing the legs of the said belt together intermediate the spaced elements and for securing the said belt to the other movable member.

6. In combination, a pair of relatively movable members, a pair of spaced elements connected to one of said members, a third element connecting the free ends of the said elements, and a coupling comprising a continuous band of flexible material encircling the said pair of elements intermediate the third element and the member carrying the spaced elements, the legs of the band being drawn together intermediate the spaced elements and secured to the other movable member, the said third element serving to prevent the band from being removed from the spaced elements when the legs of the band are drawn together.

7. In combination, a pair of relatively movable members, a pair of spaced elements associated with one of said members, means connecting the ends of the spaced elements, a coupling including a continuous belt of flexible material looped about the said spaced elements, and means for drawing the legs of the said belt together intermediate the spaced elements and for securing the said belt to the other movable member, the said first mentioned connecting means serving to prevent the removal of the belt from the spaced elements when the legs of the said belt are drawn together.

8. The combination with a supporting frame and a motor of a support for supporting the forward end of the motor on said frame, said support comprising a flexible band looped in a vertical direction, supports between opposite sides of the rear of the motor and said frame, each of said last supports comprising a looped flexible band.

9. The combination with a supporting frame and an internal combustion engine of a support for supporting the forward end of the engine on said frame, said support including rubber supporting the forward end of the engine on said frame for limited oscillation with respect thereto and at a point above the axis of the crank shaft of the engine, and supporting means for the rear end of the engine comprising resilient means connecting the engine and said frame at a point below the level of the upper end of said support and accommodating the aforesaid oscillation.

10. The combination with a supporting frame and an internal combustion engine having a crank shaft disposed in the lower part thereof with cylinders disposed above the crank shaft, of a support for supporting the forward end of the engine on said frame, said support including a transverse member carried by said frame below said crank shaft and a yoke embracing said crank shaft and connected with said transverse member on opposite sides of said crank shaft, and rubber means connecting the forward end of the engine with the upper end of said yoke and providing for a limited amount of relative vertical movement between the engine and yoke and supporting means for the rear end of the engine comprising resilient means connecting the engine and said frame at points below the level of the upper end of said yoke, said last named means providing for a limited amount of relative movement between the engine and said frame in response to torque reactions of the motor.

11. The combination with a supporting frame and an internal combustion engine, of a support for the forward end of the engine on said frame above the crank shaft, said support comprising rubber acting, at least in part, to carry the weight of the forward end of the engine by the strength of the material in tension, whereby the elasticity of the rubber is availed of and supporting means between the rear of the engine and said frame and also comprising a yielding non-metallic material.

12. The combination with a motor vehicle frame and an internal combustion engine, of longitudinally spaced rubber mountings carried by the frame and to which the engine is connected and movably held relative to the frame to respond to the impulses of the running engine, said mountings including one mounting approximately in the central vertical plane of the frame and another mounting spaced longitudinally from the first and providing for limited rocking movement of the engine relative to the frame about an axis extending diagonally relative to the engine crank shaft axis.

13. The combination with a supporting frame and an internal combustion engine of a support for the forward end of the engine on said frame above the crank shaft, said support comprising rubber so constructed and arranged as to carry the load of the engine through tensional stress of said means, whereby the elasticity of the rubber is availed of to cushion the engine in the operation thereof and support means between the rear of the engine and said frame so constructed and arranged as to accommodate movement of the engine.

14. The combination with a supporting frame and an internal combustion engine of a support for the forward end of the engine on said frame above the crank shaft, said support comprising rubber so constructed and arranged as to carry the load of the engine through tensional stress of said rubber, whereby the elasticity of the rubber is availed of to cushion the engine in the operation thereof, and support means between the rear of the motor and said frame, said support means comprising a yielding nonmetallic material.

15. In combination, an internal combustion engine having laterally projecting arms, a support for said engine, a resilient member having a given deflection rate between one arm of the engine and its support, and a resilient member having a similar deflection rate, but so arranged relative to engine and support as to provide a different deflection rate between the other arm of the engine and its support.

16. In combination, an internal combustion engine, a support at the opposite sides of said engine, an elastic member under tension having a given deflection rate between one side of the engine and its support, and an elastic member under tension having a similar deflection rate, but so arranged relative to engine and support as to provide a different deflection rate between the opposite side of said engine and its support.

17. A mounting of the class described comprising, in combination, an internal combustion engine having lateral projections at one end thereof, supporting means adjacent the lateral projections on said engine and the opposite end of said engine, an elastic member between the last mentioned end of said engine and its adjacent support, an elastic member under tension having a given deflection rate between one of said projections and its adjacent support, and an elastic member under tension having a similar deflection rate, but so arranged relative to engine and support as to provide a different deflection rate between the other of said projections and its adjacent support.

18. An engine mounting of the class described comprising, a resilient front engine support, and a pair of lateral resilient supports adjacent the rear of said engine, each of said supports being substantially identical in construction, and being arranged so as to provide a different deflection rate opposing movement of the engine in a given direction.

19. In combination, an internal combustion engine, a support for said engine including a frame, and spaced resilient supports connecting the engine with said frame, said supports being substantially identical in construction, and being arranged so as to provide different characteristics in their response to vibration of the engine.

20. In combination, an internal combustion engine, a support for the engine including a frame, and spaced resilient supports connecting the engine with said frame, said supports being substantially identical in construction, and being arranged so as to respond differently to torsional vibrations of said engine.

21. In combination, an internal combustion engine and a support, a plurality of cushion mounting members connecting engine and support and so constructed and arranged as to permit rocking movement of the engine relative to the support, at least one of said mounting members comprising rubber, so connected to engine and support parts as to resist rocking of the engine through stretch of the rubber.

22. In combination, an internal combustion engine and a support, a plurality of rubber mounting members connecting engine and support and so constructed and arranged as to permit rocking movement of the engine relative to the support, said members being so connected to engine and support parts as to resist rocking of the engine through stretch of the rubber.

23. In combination, an internal combustion engine and a support, a plurality of cushion mounting members connecting engine and support and so constructed and arranged as to permit rocking movement of the engine and relative movement between engine and support in substantially all directions, at least one of said members comprising rubber so connected to engine and support parts as to resist relative movement of the engine and support in a plurality of directions through stretch of the rubber.

24. In combination, an internal combustion engine and a support, a plurality of cushion mounting members connecting engine and support and so constructed and arranged as to permit rocking movement of the engine and relative movement between engine and support in substantially all directions, at least one of said members comprising rubber so connected to engine and support parts as to resist relative movement of the engine and support in a plurality of directions by stress of the rubber, other than compression stress.

25. In combination, an internal combustion engine and a support, a plurality of cushion mounting members connecting engine and support and so constructed and arranged as to permit relative movement between engine and support in substantially all directions, said members comprising rubber so connected to engine and support parts as to resist relative movement of the engine and support in a plurality of directions through stretch of the rubber.

26. In combination, an internal combustion engine and a support, a plurality of cushion mounting members connecting engine and support and so constructed and arranged as to permit relative movement between engine and support in substantially all directions, said members comprising rubber so connected to engine and support parts as to resist relative movement of the engine and support in a plurality of directions by stress of the rubber, other than compression stress.

27. In combination, an internal combustion engine having an inherent tendency, when operated under load, to oscillate, a support and a plurality of cushion mountings for the engine spaced longitudinally of the engine and so connected with said engine unit as to permit slight rocking movement of the engine on an axis passing through a vertical plane of the engine, at least one of said mountings being of rubber secured to engine and support parts, respectively, and being so constructed and arranged as to offer resistance to rocking movement of the engine by stretching of the rubber.

28. In combination, an internal combustion engine, supporting means and rubber mountings spaced longitudinally of the engine and carrying the engine upon the supporting means, said mountings being so constructed and arranged as to offer resilient resistance to torque reactions of the engine, the major resistance of such mountings to torque reactions being through tension of the rubber.

29. In combination, an internal combustion engine, supporting means and rubber mountings spaced longitudinally of the engine and carrying the engine upon the supporting means, said mountings being so constructed and arranged as to offer resilient resistance to torque reactions of the engine, the major resistance of the mountings to such torque reactions being through stress of the rubber other than in compression.

30. The combination of an internal combustion engine and a support therefor, spaced mounting means carried by the support and connected to the engine, one mounting means being yieldable and having shock cushioning properties and so constructed and arranged as to provide for movement of one end of the engine in paths describing various figures, the other mounting means accommodating itself to the requirements of the movement of the first said mounting means, the joint action of the said mounting means cushioning the movement due to torque impulses of the engine.

31. The combination of an internal combustion engine and a support therefor, spaced mounting means carried by the support and connected to the engine, one mounting means being yieldable and having shock cushioning properties and so constructed and arranged as to provide for movement of one end of the engine in paths describing various figures, the other mounting means accommodating itself to the requirements of the movement of the first said mounting means, the joint action of the said mounting means cushioning the movement due to torque impulses of the engine and at least some of said mounting means being so constructed and arranged as to provide a stabilizing connection between the engine and support.

32. A construction as set forth in claim 30 wherein the second mentioned mounting means offers greater restraint to movement of the engine than the first mentioned.

33. A construction as set forth in claim 30 wherein the mounting means are rubber.

34. A construction as set forth in claim 31 wherein the mounting means are rubber.

35. The combination of an internal combustion engine having, when operated, inherent oscillation, means mounting an end of said engine on the support and permitting approximately universal movement of said end of the engine, resilient means mounting the other end of the engine, spaced longitudinally from said first mounting means and constructed and arranged to permit movement of said other end in paths describing various figures, in response to impulses incident to the operation of the engine.

36. A construction as set forth in claim 35 wherein the mounting means are rubber.

In witness whereof, I hereunto subscribe my name this 15th day of November, 1932.

THOMAS L. FAWICK.